United States Patent [19]

Edelstein et al.

[11] 4,427,279

[45] Jan. 24, 1984

[54] CAMERA DEVICE FOR INCLUDING SEPARATE INFORMATION AREA ON PHOTOGRAPHS

[75] Inventors: Alan Edelstein, Philadelphia; Allan M. White, Jenkintown, both of Pa.

[73] Assignee: Micro Graphic Concepts Inc., Philadelphia, Pa.

[21] Appl. No.: 296,606

[22] Filed: Aug. 26, 1981

[51] Int. Cl.³ .............................................. G03B 17/24
[52] U.S. Cl. ................................... 354/107; 354/162; 355/40
[58] Field of Search ............... 354/105, 106, 107, 108, 354/109, 159, 162; 355/40

[56] References Cited

U.S. PATENT DOCUMENTS

| | | | |
|---|---|---|---|
| 1,362,787 | 12/1920 | Gongaware | 354/108 |
| 1,473,902 | 11/1923 | Charbeneau | 354/108 |
| 2,226,364 | 12/1940 | Anthony | 354/107 |
| 2,522,387 | 9/1950 | Livens | 354/159 |
| 3,739,697 | 6/1973 | Miyagawa et al. | 354/108 |
| 3,916,423 | 10/1975 | Ueda et al. | 354/108 |
| 4,123,767 | 10/1978 | Halpern | 354/107 |
| 4,153,365 | 5/1979 | English et al. | 354/108 |

Primary Examiner—A. A. Mathews
Attorney, Agent, or Firm—Caesar, Rivise, Bernstein & Cohen, Ltd.

[57] ABSTRACT

A camera device for including separate information area on a photograph is disclosed utilizing means for modifying a conventional instant camera having a lens and photographic film. The device is interposed between the lens and photographic film to produce a composite photograph having an information portion and an image portion. To that end, the device includes an information carrying slide which is in light transmissive communication with a first portion of the film. A lamp housed within an opaque enclosure to direct light through the slide towards a first portion of the film, concurrently with the taking of a picture. When a picture is taken, light images pass through the lens to reach a second portion of the film, concurrently with the lamp being lit to produce a composite photograph containing both the light images and the information on respective portions of a single photograph. The device also includes a range finder slide which is used with cameras containing conventional range finders to indicate the portion of the view corresponding to the image produced on the second portion of the film.

2 Claims, 4 Drawing Figures

CAMERA DEVICE FOR INCLUDING SEPARATE INFORMATION AREA ON PHOTOGRAPHS

This invention relates generally to photographic equipment, and more particularly to a composite photo system for an instant camera.

In many different areas of commerce there is an ever increasing demand for vertification and identification of people. Composite photographs containing both a picture and written information is a common and excellent device for verification and identification. For example, composite photographs are becoming commonplace for drivers' licenses and employee cards.

Although composite photographs can be produced by physically attaching a photograph to an identification card containing written information, it requires physically attaching the photograph to the information bearing card.

Furthermore, physically securing a photograph to the written portion of an identification card is less secure in that there is an inherent risk that the photograph portion may become separated from the card itself or that the card may be doctored or altered by someone switching the pictures mounted thereon.

Presently existing systems which are available to produce a composite photograph are very expensive and thus not readily purchased by smaller companies with a need for composite photographs.

Moreover, it is frequently the desire of professional and amateur photographers alike to be able to produce photographs which contain information in addition to the photographic image normally contained in the photograph.

It is therefore an object of the instant invention to provide a composite photographic system which overcomes the aforementioned disadvantages of the prior art.

It is a further object of the invention to provide a device which can be utilized with and inexpensively modifies a conventional instant camera to produce composite photographs.

It is a further object of the instant invention to provide a device for use with a conventional instant camera for producing picture identification cards containing written information integrally adjoined with the picture portion.

These and other objects of the invention are achieved by providing in a camera having a lens, shutter, shutter opening means and photographic film, a device for superimposing information on the photograph being taken. The device is interposed between the lens and photographic film and permits light images which pass through the lens to reach a first portion of the film. The device supports an information carrying slide in light transmissive communication with a second portion of the film. Means are provided for directing light through the transparent slide towards the film concurrently with the taking of a picture so that the light images and the information are both registered on the film.

Other objects and many of the attendant advantages of this invention will be readily appreciated as the same become better understood by reference to the following detailed description when considered in connection with the accompanying drawing wherein.

Figure 1:
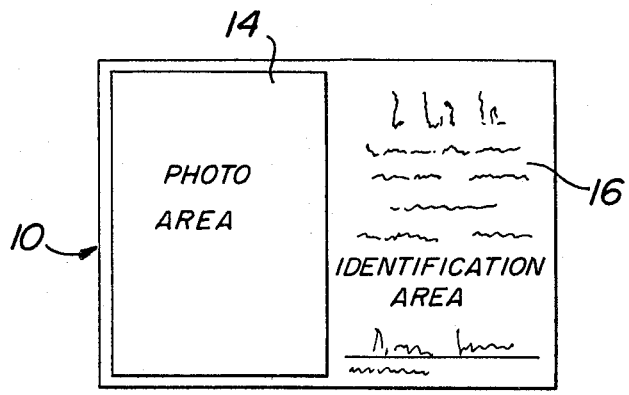
FIG. 1 is a top plan view of a composite photograph made with a camera embodying the invention.

Referring now in greater detail to the various figures of the drawing wherein like reference numerals refer to like parts, a composite photograph made with the composite photographic system embodying the invention is shown generally at 10 in FIG. 1. The photograph 10 is basically a photograph which is preferably made from commercially available self-developing POLAROID SX70 film. The photograph 10 includes a photo area 14 and an identification area 16.

For example, in one embodiment the photo area 14 contains a photograph of an employee and the identification area 16 contains specific textural material relating to the company which employs the person pictured in the photo area.

Figure 3:
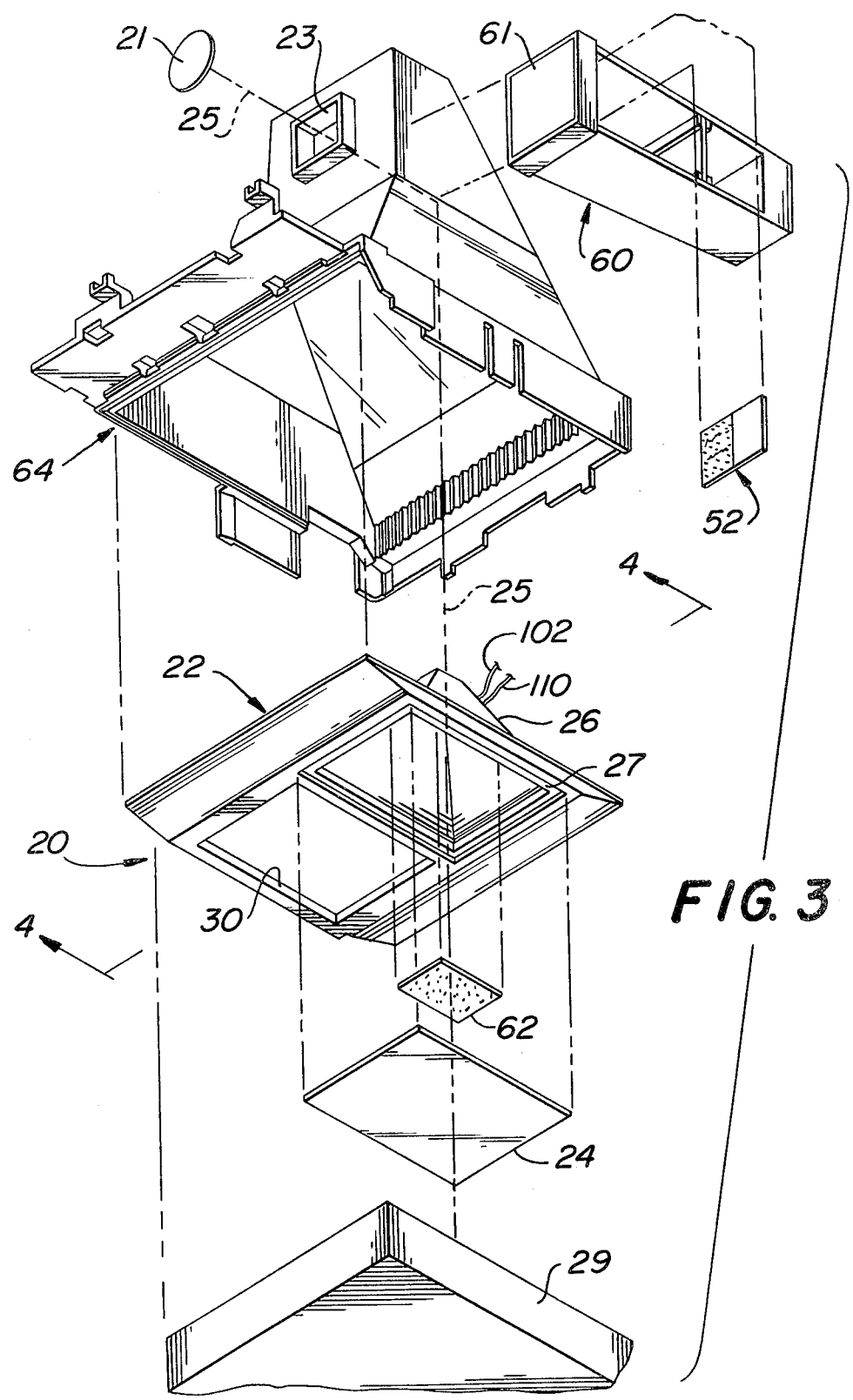
FIG. 3 is an enlarged exploded view of a camera including the composite photograph system embodying the invention.

Referring now to FIG. 3 a device for producing a composite photo system is shown at 20 in FIG. 3. The device 20 is suitable for use with several commercially available cameras and as shown in FIG. 3 is particularly adapted for use in combination with a POLAROID PRONTO B LAND CAMERA.

FIG. 3 shows the device 20 as it is incorporated within the inner frame of the camera 64. In addition to the frame 64 of the camera, the camera includes a lens 21, a rangefinder 60 and a film case 29. The case 29 includes therein a plurality of self-developing photographic sheets of film, the top sheet of which is exposed at the top surface of the case 29 to the cavity of frame 64 which is in light communication with the lens 21. A shutter and shutter opening means are provided in the camera's electronics described hereinafter.

As can be seen in FIG. 3, the composite photographic device 20 basically comprises a frame 22, a slide 24, an opaque concave enclosure 26, a light source comprised of lamp 28 (see FIG. 4; not seen in FIG. 3) and a view finder slide 52. The enclosure 26 has a rectangular opening at the bottom which is provided on one side of the frame 22 in light communication with the top surface of the top sheet of self-developing film in case 29.

Slide 24 is securely positioned within the concave enclosure 26 within a peripheral recess 27 which defines the opening to the enclosure 26. The enclosure 26 is disposed so that light radiating from lamp 28 passes out of the enclosure 26 through slide 24 towards the film. As hereinafter seen, the lamp 28 is illuminated concurrently with the user taking a picture.

As can be seen in FIG. 3, the remaining portion of frame 22 defines a rectangular opening 30 which opening defines a completely unobstructed path from the lens 21 of the camera to case 29 so that an image in the lens is transmitted onto the photo area of the film in the usual manner.

Thus, lens 21 provides light into the housing of the camera along an optical path 25 which is directed through a rectangular opening 23 provided in the frame of the camera. A mirror (not seen) deflects the light beam at a 90° angle so that it is directed towards the film case 29. The film is provided in a case with the top layer of film being exposed to the light provided through the opening 30 from lens 21 and the light provided by the lamp provided in the concave enclosure 26. The frame 22 is aligned with the top layer of film in the film case 29 and is secured within the cavity of frame 64 and enables the camera to be reassembled with the frame 22 secured therein. With the device 22 incorporated in the POLAROID PRONTO B LAND camera, the camera looks the same as if it were not modified.

Figure 4:
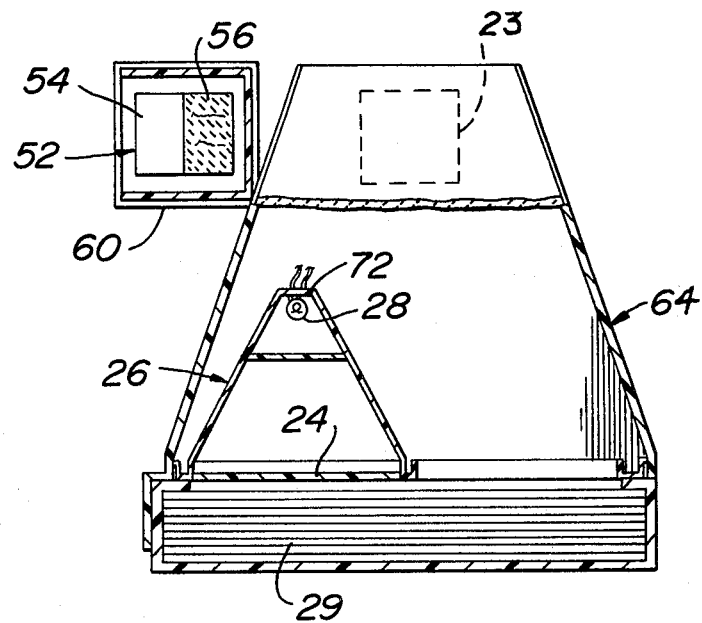
FIG. 4 is a vertical cross-sectional view of a camera embodying the invention.

As best seen in FIG. 4, concave enclosure 26 is an opaque plastic structure integrally formed with frame 22 and shaped as a four sided pyramid having a small, opaque, rectangular top wall 72 and a large rectangular base surface defined by opening 27. The slide 24 in opening 27 is positioned to face the film and is aligned with the identification area 16. Lamp 28 is securely positioned inside enclosure 26 and is located adjacent the rectangular top wall 72. Electrical leads 102 and 110 are connected to lamp 28 to conduct electrical current thereto from an electrical source. Interposed between lamp 28 and slide 24 is a blue translucent filter 62 which is disposed parallel to slide 24. Filter 62 serves to diffuse the light generated by lamp 28 and causes the background color exposed on the film to be white.

Frame 22 with enclosure 26 and opening 30 is securely mounted within the inner frame 64 of the camera assembly. Frame 64 shown in FIG. 3 is a component part of the POLAROID camera which is being marketed as the POLAROID LAND CAMERA PRONTO B.

It should be understood that device 20 can be suitably shaped to securely fit within the housing of other instant cameras which are commercially available.

Slide 24 is a transparency containing written information which is securely attached to frame 22 and positioned to completely cover the opening defined by recess 27 of enclosure 26. The front face of slide 24 is disposed facing towards the lamp 28 so that the written information appears on the film in a normal left to right configuration.

In order to properly aim the camera, the device 20 also includes a range finder slide 52. The range finder slide 52 is a rectangular slide which fits inside the camera's range finder 60 and is fixedly mounted parallel with the range finder's lens 61. Slide 52 is divided into two rectangular sections 54 and 56.

Section 55 is completely transparent and corresponds to the picture portion of the photograph. When the user of the camera looks through range finder 60 the image appearing in the pictorial section of the slide 54 corresponds to the image is directed via lens 21 to the photo area 14 of the film to produce the photograph in the photo area 14 of the developed picture.

Information section 56 of slide 52 corresponds with the written or identification area 16 of the composite photograph. Consequently, section 56 of the slide is marked with hatched lines which indicate to the person taking the photograph that the image appearing therethrough is not reproduced in the photograph 10. Instead that portion 16 of the photograph contains the written information from slide 24.

Lamp 28 is energized concurrently with the opening of the shutter. The electrical circuit and connections for accomplishing this result are shown schematically in FIG. 2.

Figure 2:
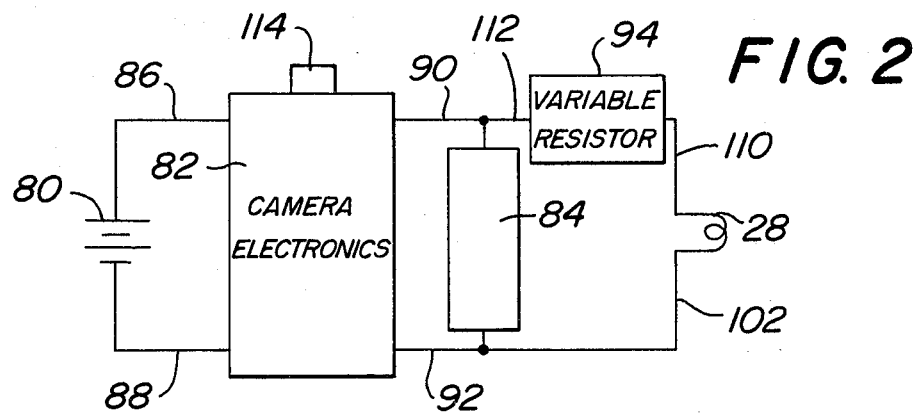
FIG. 2 is a schematic block diagram of the circuitry utilized in the device embodying the invention.

The circuitry of FIG. 2 includes a DC voltage source 80, camera electronics 82, and a solenoid 84, all of which are included within the film pack and camera. That is, in the POLAROID camera within which the composite photographic system is embodied, the SX70 film case 29 includes a DC voltage source 80, which when inserted in the camera is electrically connected to the camera electronics 82 via leads 86 and 88. The camera electronics 82 has two output leads 90 and 92 which are in turn connected to a solenoid 84.

The circuitry added to the camera includes the lamp 28 and a variable resistor 94. Lamp 28 is connected via lead 102 to the lead 92 which is connected to solenoid 84 and to the lead 90 which is connected to the other side of the solenoid 84 via lead 110, variable resistor 94 and lead 112.

The camera electronics 82 includes a shutter release button 114, the pressing of which causes the shutter incorporated within the camera to open for the purpose of transmitting light from lens 21 to the film in case 29.

The solenoid 84 is provided to control the opening and closing of the shutter blades of the camera.

Variable resistor 94 is used in serial with with lamp 28 so that the voltage provided across lamp 28 can be varied in accordance with the amount of light required by lamp 28 for properly exposing the film to produce a properly exposed contact positive print of the material contained on the slide 24.

It can therefore be seen that a new and improved composite photo system for an instant camera has been provided. The system is inexpensive to incorporate in the body of an instant camera and further is simple for the user of the camera to operate.

In operation, the camera with the composite photo system incorporated is used in the same way that the camera is normally used. Only the registration of the image of the person photographed must be differently positioned within the range finder so that the person appears within portion 54 of the slide provided in the range finder of the camera.

A photograph is then automatically produced after the shutter button 114 is pressed, thereby opening the shutter to permit the image of the person photographed to be deposited on the photo area 14 of the picture while concurrently the electrical signal provided across the solenoid 84 enables the lamp 28 to be energized to produce a positive image of the material contained on slide 24 to be provided in the identification area 16 of the ultimately produced photograph.

Without further elaboration, the foregoing will so fully illustrate our invention that others may, by applying current or future knowledge, readily adapt the same for use under various conditions of service.

What is claimed as the invention is:

1. In a camera having a lens and photographic film, a device for superimposing information on the photograph being taken, wherein said device is interposed between said lens and photographic film, said device permitting light images which pass through the lens to reach a first portion of said film, said device supporting an information carrying slide in light transmissive communication with a second portion of said film, said device comprising a frame divided into two sections, the first section being completely light transmissive and a second section being formed as an opaque, hollow, concave enclosure, said enclosure including a lamp and having an open face directed towards said film in which said slide is disposed, said device including means for adjusting the intensity of said lamp, wherein said lamp and said concave section cooperate to direct light of preselected intensity through said slide towards the film concurrently with the taking of a picture so that said light images and said information are concurrently registered on said film in a manner such that the level of exposure of said information is readily adjustable by said intensity adjusting means to produce a photograph having an information field and imagery whose respective levels of exposure are balanced relative to each other, as desired.

2. The camera of claim 1, wherein said intensity adjusting means comprises a potentiometer.

* * * * *